United States Patent
Harutyunyan et al.

(10) Patent No.: US 8,124,043 B2
(45) Date of Patent: Feb. 28, 2012

(54) METHOD OF PREPARING CARBON NANOTUBE CONTAINING ELECTRODES

(75) Inventors: Avetik Harutyunyan, Columbus, OH (US); Elena Mora, Lewis Center, OH (US)

(73) Assignee: Honda Motor Co., Ltd., Tokyo (JP)

( * ) Notice: Subject to any disclaimer, the term of this patent is extended or adjusted under 35 U.S.C. 154(b) by 718 days.

(21) Appl. No.: 11/723,185

(22) Filed: Mar. 16, 2007

(65) Prior Publication Data
US 2008/0280751 A1    Nov. 13, 2008

(51) Int. Cl.
*D01F 9/12* (2006.01)
*B01J 23/00* (2006.01)
*H01B 1/06* (2006.01)

(52) U.S. Cl. .......... 423/447.1; 423/447.7; 502/87; 502/182; 502/183; 502/184; 502/185; 252/506; 977/742

(58) Field of Classification Search .......... 423/447.1, 423/447.5, 447.7; 502/87, 182, 183, 184, 502/185; 252/506; 977/742
See application file for complete search history.

(56) References Cited

U.S. PATENT DOCUMENTS

| | | | |
|---|---|---|---|
| 6,846,345 B1 | 1/2005 | Keller et al. | |
| 6,875,374 B1 | 4/2005 | Zhan et al. | |
| 6,911,412 B2 | 6/2005 | Hampden-Smith et al. | |
| 6,960,389 B2 | 11/2005 | Tennent et al. | |
| 6,974,492 B2 * | 12/2005 | Harutyunyan et al. | 75/351 |
| 7,061,749 B2 | 6/2006 | Liu et al. | |
| 7,105,246 B2 | 9/2006 | Suzuki et al. | |
| 2003/0143453 A1 | 7/2003 | Ren et al. | |
| 2004/0072683 A1 | 4/2004 | Kodas et al. | |
| 2004/0115516 A1 | 6/2004 | Miyake et al. | |
| 2004/0197638 A1 | 10/2004 | McElrath et al. | |
| 2004/0241532 A1 | 12/2004 | Kim et al. | |
| 2005/0008562 A1 | 1/2005 | Hyeon et al. | |
| 2005/0085379 A1 | 4/2005 | Ishihara et al. | |
| 2005/0220988 A1 | 10/2005 | Dodelet et al. | |
| 2005/0238810 A1 | 10/2005 | Scaringe et al. | |
| 2005/0260117 A1 | 11/2005 | Cossement et al. | |
| 2005/0287418 A1 | 12/2005 | Noh et al. | |
| 2006/0104889 A1 | 5/2006 | Harutyunyan et al. | |

FOREIGN PATENT DOCUMENTS

| | | |
|---|---|---|
| FR | 2826646 A1 | 1/2003 |
| WO | 2006/091277 A2 | 8/2006 |

OTHER PUBLICATIONS

Colomer et al. "Large-scale synthesis of single-wall carbon nanotubes by catalytic chemical vapor deposition (CCVD) method" Chem. phys. lett. 317 (200) 83-89.*
Cassell et al. "Large Scale CVD Synthesis of Single-Walled Carbon Nanotubes", J. Phys. Chem. B 1999, 103, 6484-6492.*

(Continued)

*Primary Examiner* — Emily Le
*Assistant Examiner* — Rebecca Lee
(74) *Attorney, Agent, or Firm* — Capitol City TechLaw, PLLC; Mark E. Duell

(57) ABSTRACT

The present teachings are directed toward a matrix containing nanosized metal components and carbon nanotubes, with the carbon nanotubes being produced in situ by the nanosized metal components upon the contacting of the nanosized metal components with a carbon source under conditions sufficient to produce the carbon nanotubes. Also disclosed are methods of producing the matrix containing the nanosized metal components and carbon nanotubes.

18 Claims, 2 Drawing Sheets

OTHER PUBLICATIONS

Harutyunyan, A.R., et al.; "CVD Synthesis of Single Wall Carbon Nanotubes under "Soft" Conditions," Nano Letters, vol. 2, No. 5, pp. 525 (2002), American Chemical Society.

Harutyunyan, A.R., et al.; "Purification of Single-Wall Carbon Nanotubes by SElective Microwave Heating of Catalyst Particles," J. Phys. Chem B, vol. 106, pp. 8671, (2002), American Chemical Society.

Harutyunyan, A.R., et al.; "Evolution of catalyst particle size during carbon single walled nanotube growth and its effect on the tube characteristics," Applied Physics, vol. 100, 044321 (2006), American Institute of Physics.

Harutyunyan, A.R., et al.; "CVD Synthesis of Single Wall Carbon Nanotubes under "Soft" Conditions," Nano Letters, Jan. 1, 2002, vol. 2, No. 3, pp. 525-530, ACS, Washington, DC, US.

Chen, J.H., et al.; "Electrochemical characterization of carbon nanotubes as electrode in electrochemical double-layer capacitors," Carbon, Jul. 1, 2002, vol. 40, No. 8, pp. 1193-1197, Elsevier, Oxford, GB.

Venegoni, D., et al.; "Parametric study for the growth of carbon nanotubes by catalytic chemical vapor deposition in a fluidized bed reactor," Carbon, Aug. 1, 2002, vol. 40, pp. 1799-1807, Elsevier, Oxford, GB.

Louis, B., et al.; "High yield synthesis of multi-walled carbon nanotubes by catalyst cecomposition of ethane over iron supported on alumina catalyst," Catalysis Today, May 15, 2005, vol. 102-103, pp. 23-28, Elsevier, Oxford, GB.

Colomer, J. F., et al., "Different purification methods of carbon nanotubes produced by catalytic synthesis," Synthetic Metals, Jun. 1, 1999, vol. 103, No. 1-3, pp. 2482-2483, Elsevier Sequoia, Lausanne, CH.

Ko, C-J., et al.; "Highly efficient microwave-assisted purification of multiwalled carbon nanotubes," Microelectronic Engineering, Jun. 1, 2004, vol. 73-74, pp. 570-577, Elsevier Publishers BV, Amsterdam, NL.

Mauron, PH., et al.; "Fludised-bed CVD synthesis of carbon nanotubes on Fe2O3/MgO," Diamond and Related Materials, Mar. 1, 2003, vol. 12, No. 3-7, pp. 780-785, Elsevier Science Publishers, Amsterdam, NL>.

International Search Report from PCT/US2008/56772 mailed Jul. 17, 2009.

* cited by examiner

METHOD OF PREPARING CARBON NANOTUBE CONTAINING ELECTRODES

BACKGROUND

1. Field of the Invention

The present teachings relate to methods of preparing carbon nanotube containing electrodes utilizing nanosized metal catalyst particles to produce carbon nanotubes. Also presented are compositions with nanotubes and the metal catalysts used to produce the nanotubes homogenously distributed among the nanotubes.

2. Discussion of the Related Art

For carbon-based electrodes, particularly those electrode compositions for use in fuel cells, homogenous distribution of unagglomerated metallic particles can be one important performance determinative factor. Known ways of preparing electrode compositions have included distributing nanosized metallic particles in a pre-existing carbon matrix and also thermally decomposing organometallic compounds present in a pre-existing carbon matrix. With these known methods, difficulties were encountered with controlling both agglomeration of smaller particles and the particle size of particles initially formed from the decomposed organometallic compounds.

A need exists for methods of preparing compositions for use in making electrodes that have a homogeneous distribution of metallic particles within and among the carbon matrix.

SUMMARY

The present disclosure is directed to methods of preparing carbon nanotubes by providing metal catalyst salts, a support component, and solvents, then contacting the metal catalyst salts with a first solvent to form a metal salt-containing solution. The support component and a second solvent are contacted to form a support component suspension, which is then contacted with the metal catalyst salt-containing solution to form a supported metal catalyst. The solvents are then removed, and the supported metal catalyst is heated. The supported metal catalyst is then ground to produce an supported metal catalyst powder. The supported metal catalyst powder is contacted with a carbon source to form carbon nanotubes and carbon-containing non-carbon nanotube material on the supported metal catalyst powder.

Another method presented by the present disclosure involves providing a metal catalyst salt, a surfactant and a support component, and contacting the metal catalyst salt and the surfactant to form a first mixture then heating the first mixture to form metal catalyst nanoparticles. The metal catalyst nanoparticles and the support component are contacted to form supported metal catalyst nanoparticles, which are then dried. The supported metal catalyst nanoparticles are contacted with a carbon source to form carbon nanotubes and carbon-containing non-carbon nanotube material on the supported metal catalyst nanoparticles. The metal catalyst nanoparticles can be metal catalyst nanoparticles having diameters ranging between about 1 nm and about 11 nm.

A matrix preparation method is also provided. The method of producing a matrix includes providing nanosized particles of metal catalyst, contacting the nanosized particles of metal catalyst with a carbon source under conditions sufficient to produce carbon nanotubes, producing carbon nanotubes, and forming a matrix comprising the nanosized particles of metal catalyst distributed within the carbon nanotubes.

The present disclosure also includes a matrix including nanosized metal components and carbon nanotubes, with the carbon nanotubes produced in situ by the nanosized metal components upon the contacting of the nanosized metal components with a carbon source under conditions sufficient to produce the carbon nanotubes.

BRIEF DESCRIPTION OF THE DRAWINGS

The accompanying drawings which are included to provide a further understanding of the present disclosure and are incorporated in and constitute a part of this specification, illustrate various embodiments of the present disclosure and together with the detailed description serve to explain the principles of the present disclosure. In the drawings.

DETAILED DESCRIPTION

Figure 1:
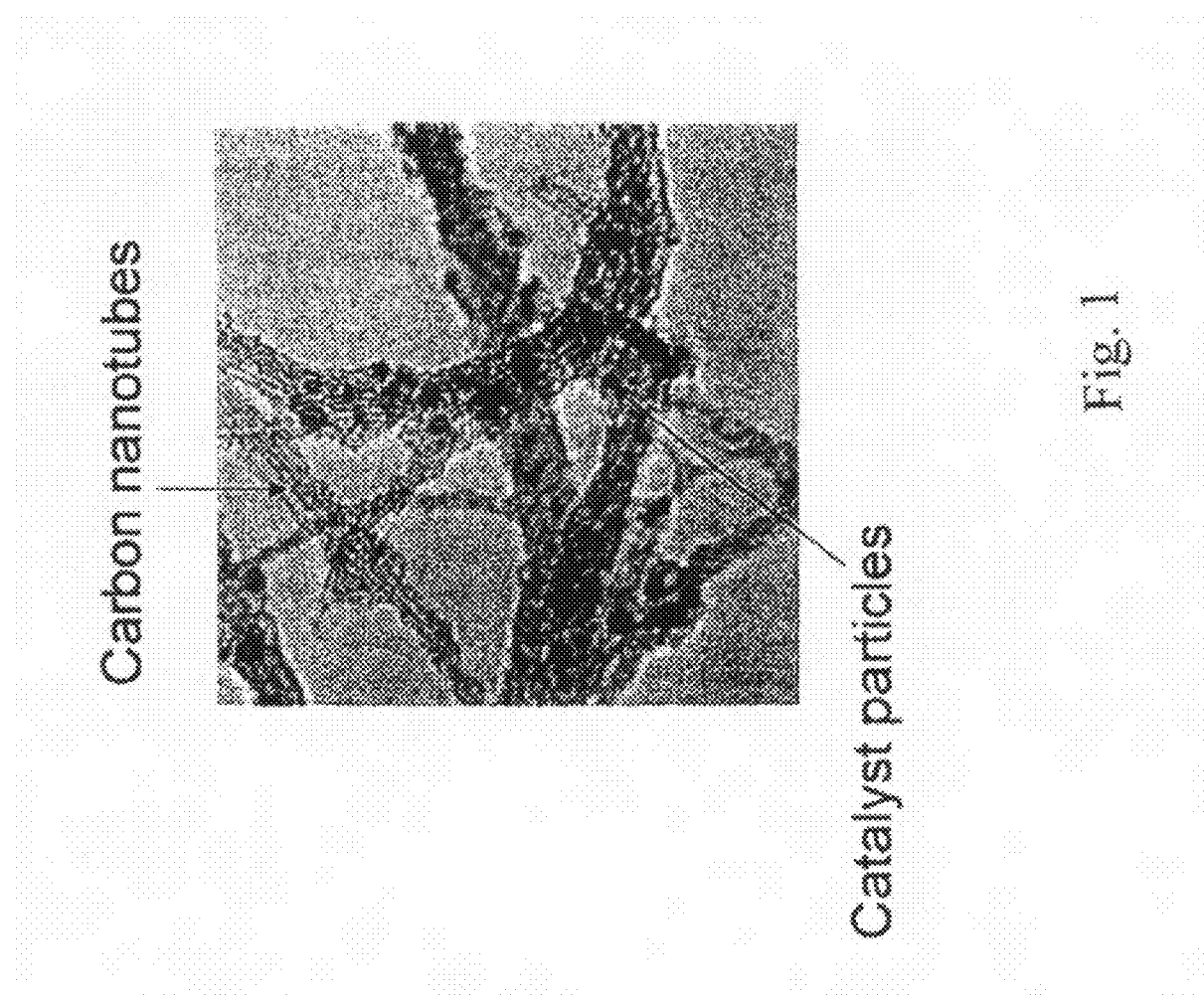
FIG. 1 is a microphotograph of a typical material produced by the methods of the present disclosure.

The present teachings are directed to a first method of preparing carbon nanotubes by providing metal catalyst salts, a support component and solvents. The metal catalyst salts are contacted with a first solvent to form a metal salt-containing solution. The support component and a second solvent are contacted to form a support component suspension. The metal catalyst salt-containing solution is contacted with the support component suspension to form a supported metal catalyst, and the first and second solvents are removed. The supported metal catalyst is then heated, and then ground to produce an supported metal catalyst powder. The supported metal catalyst powder is contacted with a carbon source to form carbon nanotubes and carbon-containing non-carbon nanotube material on the supported metal catalyst powder.

The first solvent and second solvents can, independently, include at least one element selected from the group consisting of water, methanol, ethanol, propanol, butanol, glycol, tetrahydrofuran, and mixtures thereof.

The first method can include an additional step of contacting the carbon nanotubes and carbon-containing non-carbon nanotube material on the supported metal catalyst powder with an acid sufficiently strong to remove the support component. The acid can include at least one element selected from the group consisting of hydrofluoric acid, sulfuric acid, nitric acid, and mixtures thereof.

It has been observed that use of sulfuric acid can have deleterious effects on magnesia supported components. Likewise, it has been observed that nitric acid may leach or remove iron from iron-containing catalyst components.

After the support component is removed, a further step of radiating the carbon nanotubes and carbon-containing non-carbon nanotube material on the supported metal catalyst powder with microwave radiation to thereby oxidize the carbon-containing non-carbon nanotube material can occur. The carbon nanotubes and carbon-containing non-carbon nanotube material, alternatively, can be heating, by any means, to a temperature sufficient to oxidize the carbon-containing non-carbon nanotube material. The process of heating can be to a temperature of about 350 C. These heating steps are preferably performed under oxidizing environments, such as, air or dry air.

The support component can include at least one element selected from the group consisting of alumina, silica, magnesia, zirconia and zeolites.

The metal catalyst salts can include at least one element selected from the group consisting of chromium, iron, cobalt, nickel, copper, zinc, molybdenum, palladium, silver, tungsten, platinum, gold and mixtures thereof. The metal catalyst salts can include acetates, nitrates, nitrites, carbonates, sulfates, chlorides, hydroxides, acetylacetonate and mixtures thereof.

The carbon source can include at least one element selected from the group consisting of carbon monoxide, methane, ethane, ethylene, propane, propylene, butane, butylene, acetylene, benzene, naphthalene, toluene, alcohols, methanol, ethanol, propanol, butanol, acetone and mixtures thereof.

In the above-described method, the supported metal catalyst powder can be contacted with a reducing atmosphere prior to contacting the supported metal catalyst powder with the carbon source.

The carbon-containing non-carbon nanotube material can include, for instance, amorphous carbon, multi-shell carbon, carbon-containing shells, carbon black and carbides.

The ratio between the metal catalyst salts and the support component has been observed as having an effect on the particle size of the resulting supported metal catalyst, for the above method, the metal catalyst salts and the support component can be in a molar ratio ranging from between about 1:5 to about 1:100, or a molar ratio ranging from between about 1:15 to about 1:60, or, in a further embodiment, a molar ratio ranging from between about 1:15 to about 1:40.

In the presently disclosed methods, varying the molar ratio of the metal catalyst salts to the support component, can change the particle size of the supported metal catalyst. With the presently disclosed method, with selection of an appropriate molar ratio between the metal catalyst salts to the support component, the particle size of the supported metal catalyst can ranges between about 3 nm and about 11 nm.

Electrodes incorporating the metal catalyst salt and the carbon nanotubes prepared according to the presently disclosed methods are also provided by the present disclosure. Electrodes prepared with carbon nanotubes according to the disclosed method are expected to provide an electrode structure with more highly dispersed nanosized metallic particles in the carbon nanotube matrix.

An additional method of preparing carbon nanotubes including providing a metal catalyst salt, a support component and a surfactant, contacting the metal catalyst salt and the surfactant to form a first mixture, and then heating the first mixture to form metal catalyst nanoparticles is provided by the present disclosure. The metal catalyst nanoparticles are then contacted with the support component to form supported metal catalyst nanoparticles, which can then be dried. The dried supported metal catalyst nanoparticles can be contacted with a carbon source to form carbon nanotubes and carbon-containing non-carbon nanotube material on the supported metal catalyst nanoparticles. Metal catalyst nanoparticles having diameters ranging between about 1 nm and about 11 nm can be utilized in this additional method.

The surfactant can include, for example, any one of water, methanol, ethanol, propanol, butanol, glycol, tetrahydrofuran, and mixtures thereof.

An additional step in the above method includes contacting the carbon nanotubes and carbon-containing non-carbon nanotube material on the supported metal catalyst nanoparticles with an acid sufficiently strong to remove the support component. Examples of sufficiently strong acid include hydrofluoric acid, sulfuric acid, nitric acid, and mixtures thereof.

Following removal of the support component the carbon nanotubes and carbon-containing non-carbon nanotube material on the supported metal catalyst powder can be heated, or radiated with, for example, microwave radiation. The microwave radiation can result in the oxidation of the carbon-containing non-carbon nanotube material. The heating can include heating to a temperature sufficient to oxidize the carbon-containing non-carbon nanotube material. One example of a temperature sufficient to oxidize the carbon-containing non-carbon nanotube material can be a temperature of about 350 C.

The support component can include, for instance, at least one element selected from the group consisting of alumina, silica, magnesia, zirconia and zeolites.

The metal catalyst salts can be selected from the group consisting of chromium, iron, cobalt, nickel, copper, zinc, molybdenum, palladium, silver, tungsten, platinum, gold and mixtures thereof. The metal catalyst salts can include, for example, acetates, nitrates, nitrites, carbonates, sulfates, chlorides, hydroxides, acetylacetonate and mixtures thereof.

For the above method, the carbon source can include at least one element selected from the group consisting of carbon monoxide, methane, ethane, ethylene, propane, propylene, butane, butylene, acetylene, benzene, naphthalene, toluene, alcohols, methanol, ethanol, propanol, butanol, acetone and mixtures thereof.

In the above method, one further step can be contacting the supported metal catalyst powder with a reducing atmosphere prior to contacting the supported metal catalyst nanoparticles with the carbon source. The metal catalyst salts and the support component can be in a molar ratio ranging from between about 1:5 to about 1:100, or, for instance, a molar ratio ranging from between about 1:15 to about 1:40.

The carbon-containing non-carbon nanotube material that can be formed during the formation of the carbon nanotubes can include various undesired components including amorphous carbon, multi-shell carbon, carbon-containing shells, carbon black and carbides.

In the various ways of utilizing the presently disclosed method, the metal catalyst nanoparticles can have diameters ranging between about 3 nm and about 8 nm. The particle size of the supported metal catalyst nanoparticles can be varied according to the molar ratio of the metal catalyst salts to the support component, with smaller particles produced when the metal catalyst salts are less concentrated.

A method of producing a matrix of metal catalyst and carbon nanotubes is also provided by the present disclosure. The method includes providing nanosized particles of metal catalyst and contacting the nanosized particles of metal catalyst with a carbon source under conditions sufficient to produce carbon nanotubes. The carbon nanotubes are then produced and form a matrix containing the nanosized particles of metal catalyst distributed within the carbon nanotubes.

This matrix production method can utilize various metal catalysts including, without limitation, chromium, iron, cobalt, nickel, copper, zinc, molybdenum, palladium, silver, tungsten, platinum, gold and mixtures thereof. The carbon source used by this method can include carbon monoxide, methane, ethane, ethylene, propane, propylene, butane, butylene, acetylene, benzene, naphthalene, toluene, alcohols, methanol, ethanol, propanol, butanol, acetone and mixtures thereof.

The nanosized particles of metal catalyst can be contacted with a reducing atmosphere prior to contacting the nanosized particles of metal catalyst with the carbon source.

In some variations of the matrix production method, the nanosized particles of metal catalyst can be supported on a support component. Examples of suitable support components include alumina, silica, magnesia, zirconia and zeolites.

Similar to the carbon nanotube preparation methods disclosed herein, the molar ratio between the nanosized particles of metal catalyst and the support component for the matrix production method can be varied the molar ratio of the nanosized particles of metal catalyst to the support component, and the variation of the molar ratio changes the particle size of the nanosized particles of metal catalyst. Examples of suitable molar ratios can range from between about 1:5 to about 1:100, or from between about 1:15 to about 1:40.

The nanosized particles of metal catalyst used in the method to produce the matrix can include particles having diameters ranging between about 1 nm and about 11 nm, or diameters ranging between about 3 nm and about 8 nm.

The present disclosure also includes electrodes containing the matrix prepared according to the disclosed matrix production method.

A matrix containing nanosized metal components and carbon nanotubes is also disclosed by the present teachings. The carbon nanotubes contained in the matrix are produced in situ by the nanosized metal components upon the contacting of the nanosized metal components with a carbon source under conditions sufficient to produce the carbon nanotubes. This methodology results in the nanosized metal components being distributed within the carbon nanotubes.

The nanosized metal components include, for example, chromium, iron, cobalt, nickel, copper, zinc, molybdenum, palladium, silver, tungsten, platinum, gold and mixtures thereof. Examples of suitable carbon sources include carbon monoxide, methane, ethane, ethylene, propane, propylene, butane, butylene, acetylene, benzene, naphthalene, toluene, alcohols, methanol, ethanol, propanol, butanol, acetone and mixtures thereof.

In some instances, the matrix can have the nanosized metal components that have been contacted with a reducing atmosphere prior to contacting the nanosized metal components with the carbon source.

In yet other examples of the presently disclosed matrix, the nanosized metal components can be supported on a support component when the nanosized metal components are contacted with the carbon source. Examples of suitable support components include alumina, silica, magnesia, zirconia and zeolites. The support component can be removed from the catalyst after the nanosized metal components are contacted with the carbon source.

The nanosized metal components and the support component can be in a molar ratio ranging from between about 1:5 to about 1:100, or can be in a molar ratio ranging from between about 1:15 to about 1:40. It has been observed that, for the presently disclosed matrix, changes in the molar ratio of the nanosized metal components to the support component change the particle size of the nanosized metal components.

The nanosized metal components can include particles having diameters ranging between about 1 nm and about 11 nm in some instances. In further embodiments of the present matrix, the nanosized metal components can include particles having diameters ranging between about 3 nm and about 8 nm.

Fuel cell electrodes can be made containing the matrix according to the present teachings.

All publications, articles, papers, patents, patent publications, and other references cited herein are hereby incorporated herein in their entireties for all purposes.

Although the foregoing description is directed to the preferred embodiments of the present teachings, it is noted that other variations and modifications will be apparent to those skilled in the art, and which may be made without departing from the spirit or scope of the present teachings.

The following examples are presented to provide a more complete understanding of the present teachings. The specific techniques, conditions, materials, and reported data set forth to illustrate the principles of the principles of the present teachings are exemplary and should not be construed as limiting the scope of the present teachings.

EXAMPLES

Example 1

Iron acetate ($Fe(OOCCH_3)_2$ (Alpha AESAR) can be mixed into methanol and a separate suspension of alumina (Alpha AESAR) in methanol can also be prepared and then the two solutions mixed thoroughly for one hour. The molar ratio between the iron and the alumina can be about 1:30. The solvent can then be evaporated and the remaining mass heated to 120 C for 3 hours under a nitrogen gas flow. The dried mass can be allowed to cool and then ground in an agate mortar. The powder can then be calcined for 1 hour at 500 C and then ground and loaded into a quartz tube flow reactor of a chemical vapor deposition ("CVD") apparatus.

Argon gas can be passed over the ground powder in the reactor as the temperature can then be raised at 10 C/minute until a steady temperature of 820 C is reached. A mixture of methane (40 sccm) diluted in argon (200 sccm) can then be passed over the catalyst powder for 60 minutes.

The resulting material can be studied by Raman spectroscopy and TEM to confirm the growth of carbon nanotubes. The alumina can be removed with application of HF acid. Carbon containing non-carbon nanotube material can be removed by radiating with microwave radiation (2.45 GHZ at 150 W) in air. The material can be cooled to room temperature and then pressed to make thin film electrodes or pellets.

Example 2

Iron acetylacetonate ($Fe(CH_3COCHCOCH_3)_3$ (Alpha AESAR) can be mixed into methanol and a separate suspension of magnesia (Alpha AESAR) in methanol can also be prepared and then the two solutions mixed thoroughly for one hour. The molar ratio between the iron and the magnesia can be about 1:25. The solvent can then be evaporated and the remaining mass heated to 120 C for 3 hours under a nitrogen gas flow. The dried mass can be allowed to cool and then ground in an agate mortar. The powder can then be calcined for 1 hour at 500 C and then ground and loaded into a quartz tube flow reactor of a CVD apparatus.

The ground powder can then be reduced in situ by flowing a gas mixture of 40 sccm $H_2$ and 100 sccm He at 500 C for 1 hour. Then, argon gas can be passed over the catalyst in the reactor as the temperature can then be raised at 10 C/minute until a steady temperature of 820 C is reached. A mixture of methane (40 sccm) diluted in argon (200 sccm) can then be passed over the catalyst powder for 5 minutes.

The resulting material can be studied by Raman spectroscopy and TEM to confirm the growth of carbon nanotubes. The magnesia can be removed with application of sulfuric acid. Carbon containing non-carbon nanotube material can be removed by radiating with microwave radiation (2.45 GHZ at 150 W) in air. The material can be cooled to room temperature and then pressed to make thin film electrodes or pellets.

Example 3

Iron acetate ($Fe(OOCCH_3)_2$ (Alpha AESAR) can be mixed into glycol at a 1:15 molar concentration ratio and then can be heated to 150 C under nitrogen for twenty minutes to form iron nanoparticles. The reaction mixture can be allowed to cool to room temperature and then alumina (Alpha AESAR) can be added to the iron/glycol mixture in a molar ratio of 1:30 metal:alumina. The solution can be stirred for four hours, and then the solvent can be removed by flowing nitrogen gas. The dried mass can be collected then can be loaded into a quartz tube flow reactor of a CVD apparatus.

The catalyst can then be reduced in situ by flowing a gas mixture of 40 sccm $H_2$ and 100 sccm He at 500 C for 1 hour. Then, argon gas can be passed over the catalyst in the reactor as the temperature can then be raised at 10 C/minute until a steady temperature of 820 C is reached. A mixture of methane (40 sccm) diluted in argon (200 sccm) can then be passed over the catalyst powder for 30 minutes.

The resulting material can be studied by Raman spectroscopy and TEM to confirm the growth of carbon nanotubes. The alumina can be removed with application of HF acid. Carbon containing non-carbon nanotube material can be removed by heating the resulting material to 350 C under a flow of dry oxygen (20%) in nitrogen. The material can be cooled to room temperature and then pressed to make thin film electrodes or pellets.

Example 4

Iron acetate ($Fe(OOCCH_3)_2$) (Alpha AESAR) can be suspended in mixed into glycol at a 1:15 molar concentration ratio and then can be heated to 150 C under nitrogen for twenty minutes to form iron nanoparticles. The reaction mixture can be allowed to cool to room temperature and then alumina (Alpha AESAR) can be added to the iron/glycol mixture in a molar ratio of 1:40 metal:alumina. The solution can be stirred for four hours, and then the solvent can be removed by flowing nitrogen gas. The dried mass can be collected then can be loaded into a quartz tube flow reactor of a CVD apparatus.

Argon gas can be passed over the catalyst in the reactor as the temperature can then be raised at 10 C/minute until a steady temperature of 820 C is reached. A mixture of methane (40 sccm) diluted in argon (200 sccm) can then be passed over the catalyst powder for 5 minutes.

The resulting material can be studied by Raman spectroscopy and TEM to confirm the growth of carbon nanotubes. The alumina can be removed with application of HF acid. Carbon containing non-carbon nanotube material can be removed by heating the resulting material to 350 C under a flow of dry oxygen (20%) in nitrogen. The material can be cooled to room temperature and then pressed to make thin film electrodes or pellets.

Figure 2:
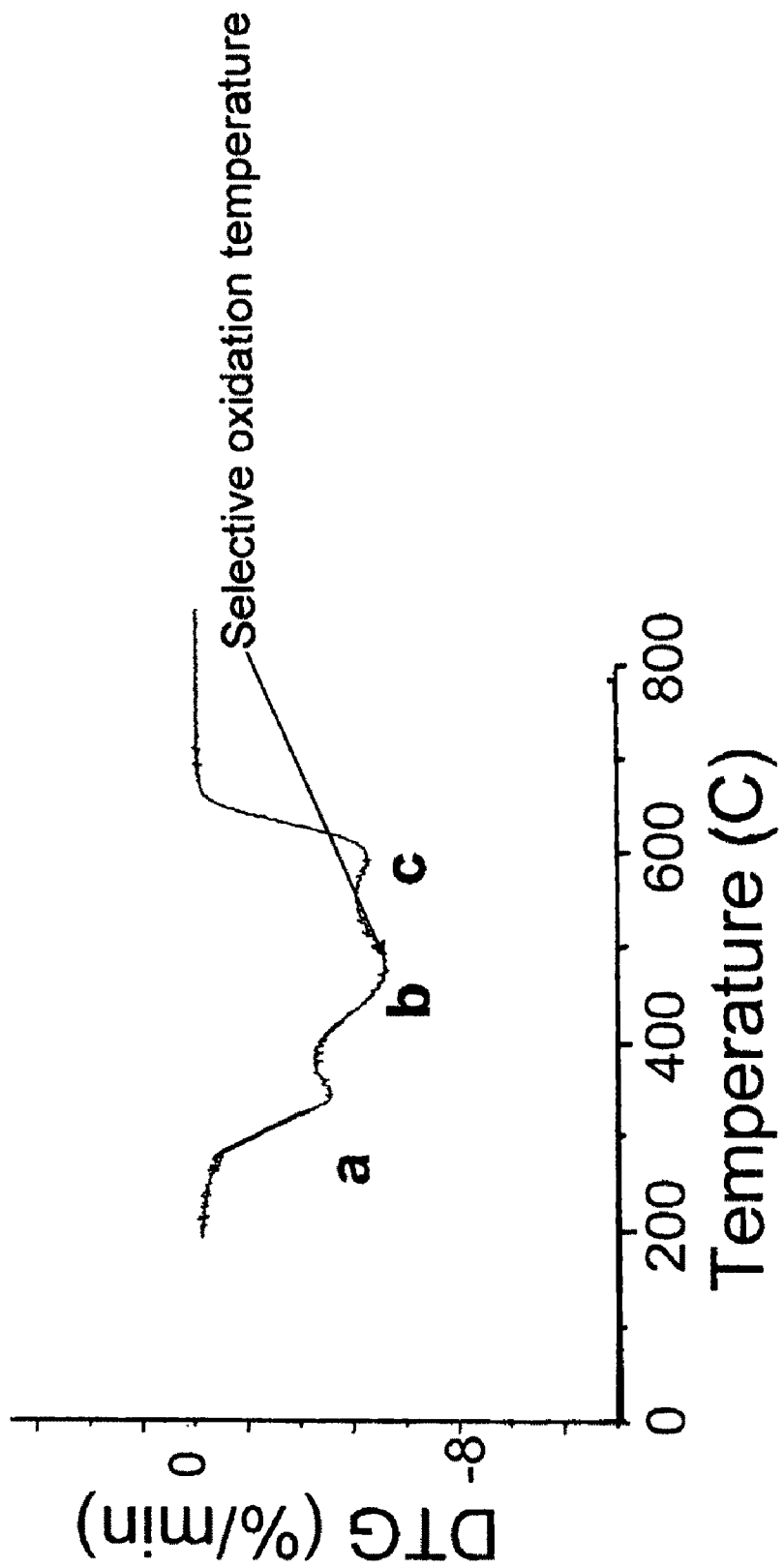
FIG. 2 is a graph of a temperature programmed oxidation of material according to the present disclosure oxidized under an airflow of 100 sccm at a heating rate of 5 C/min.

FIG. 1 is a microphotograph of material produced according to the presently disclosed methods. The presence of the catalyst nanoparticles surrounded by the carbon nanotubes produced by those catalyst nanoparticles remaining after removal of the catalyst support material can be observed therein. FIG. 2 illustrates a typical temperature programmed oxidation of a typical material produced according to the presently disclosed methods. The material was heated under an air flow of 100 sccm at a heating rate of 5 C/minute. The oxidation of amorphous carbon, marked "a", occurs first and at a temperature of about 330 C, followed by the oxidation of multi-shell carbon, marked "b", at a temperature of about 480 C, and then lastly the oxidation of the carbon single-walled nanotubes, marked "c" at about 600 C.

The thin film electrode and pellet samples prepared above can be tested for performance by using them as oxygen reduction electrodes in hydrogen fuel cell apparatus and comparing the performance and peak conversion efficiencies for the Examples. The performance of the Examples can also be compared to standard fuel cell electrodes, for instance, a precious metal dispersion on alumina or other suitable substrate, where the precious metal catalyst particles have average particle sizes of greater than about 10 nanometers.

The foregoing detailed description of the various embodiments of the present teachings has been provided for the purposes of illustration and description. It is not intended to be exhaustive or to limit the present teachings to the precise embodiments disclosed. Many modifications and variations will be apparent to practitioners skilled in this art. The embodiments were chosen and described in order to best explain the principles of the present teachings and their practical application, thereby enabling others skilled in the art to understand the present teachings for various embodiments and with various modifications as are suited to the particular use contemplated. It is intended that the scope of the present teachings be defined by the following claims and their equivalents.

What we claim is:

1. A method of preparing carbon nanotubes comprising
providing a metal catalyst salt and a surfactant;
contacting the metal catalyst salt and the surfactant to form a first mixture;
heating the first mixture to form metal catalyst nanoparticles;
providing a support component;
contacting the support component and the metal catalyst nanoparticles to form supported metal catalyst nanoparticles;
drying the supported metal catalyst nanoparticles; and
contacting the supported metal catalyst nanoparticles with a carbon source to form carbon nanotubes and carbon-containing non-carbon nanotube material on the supported metal catalyst nanoparticles, and
wherein the metal catalyst nanoparticles comprise metal catalyst nanoparticles having diameters ranging between about 1 nm and about 11 nm, the surfactant comprises a compound having a molecular weight of no greater than about 75 g/mol, and comprises at least one element selected from the group consisting of water, methanol, ethanol, propanol, butanol, glycol, tetrahydrofuran, and mixtures thereof, and
the heating of the first mixture is to a temperature ranging from greater than about 32° C. to less than the melting point temperature or decomposition temperature of the metal catalyst salt.

2. The method according to claim 1 further comprising contacting the carbon nanotubes and carbon-containing non-carbon nanotube material on the supported metal catalyst nanoparticles with an acid sufficiently strong to remove the support component.

3. The method according to claim 2, wherein the acid comprises at least one element selected from the group consisting of hydrofluoric acid, sulfuric acid, nitric acid, and mixtures thereof.

4. The method according to claim 2 further comprising radiating the carbon nanotubes and carbon-containing non-carbon nanotube material on the supported metal catalyst powder with microwave radiation.

5. The method according to claim 4, wherein the carbon-containing non-carbon nanotube material is oxidized.

6. The method according to claim 2 further comprising heating the carbon nanotubes and carbon-containing non-carbon nanotube material.

7. The method according to claim 6, wherein the heating comprises heating to a temperature sufficient to oxidize the carbon-containing non-carbon nanotube material.

8. The method according to claim 6, wherein the heating comprises heating to a temperature of about 350° C.

9. The method according to claim 1, wherein the support component comprises at least one element selected from the group consisting of alumina, silica, magnesia, zirconia and zeolites.

10. The method according to claim 1, wherein the metal catalyst salts comprise at least one element selected from the group consisting of chromium, iron, cobalt, nickel, copper, zinc, molybdenum, palladium, silver, tungsten, platinum, gold and mixtures thereof.

11. The method according to claim 1, wherein the metal catalyst salts comprise acetates, nitrates, nitrites, carbonates, sulfates, chlorides, hydroxides, acetylacetonate and mixtures thereof.

12. The method according to claim 1, wherein the carbon source comprises at least one element selected from the group consisting of carbon monoxide, methane, ethane, ethylene, propane, propylene, butane, butylene, acetylene, benzene, naphthalene, toluene, alcohols, methanol, ethanol, propanol, butanol, acetone and mixtures thereof.

13. The method according to claim 1 further comprising contacting the supported metal catalyst powder with a reducing atmosphere prior to contacting the supported metal catalyst nanoparticles with the carbon source.

14. The method according to claim 1, wherein the carbon-containing non-carbon nanotube material comprises at least one element selected from the group consisting of amorphous carbon, multi-shell carbon, carbon-containing shells, carbon black and carbides.

15. The method according to claim 1, wherein the metal catalyst salts and the support component are in a molar ratio ranging from between about 1:5 to about 1:100.

16. The method according to claim 1, wherein the metal catalyst salts and the support component are in a molar ratio ranging from between about 1:15 to about 1:40.

17. The method according to claim 1, wherein the metal catalyst nanoparticles have diameters ranging between about 3 nm and about 8 nm.

18. The method according to claim 1 further comprising varying the molar ratio of the metal catalyst salts to the support component, wherein varying the molar ratio changes the particle size of the supported metal catalyst nanoparticles.

* * * * *